May 24, 1960     H. C. BEAVER     2,937,442
STANDARD CLOTH CUTTING MACHINE BLADE
Filed Jan. 12, 1959
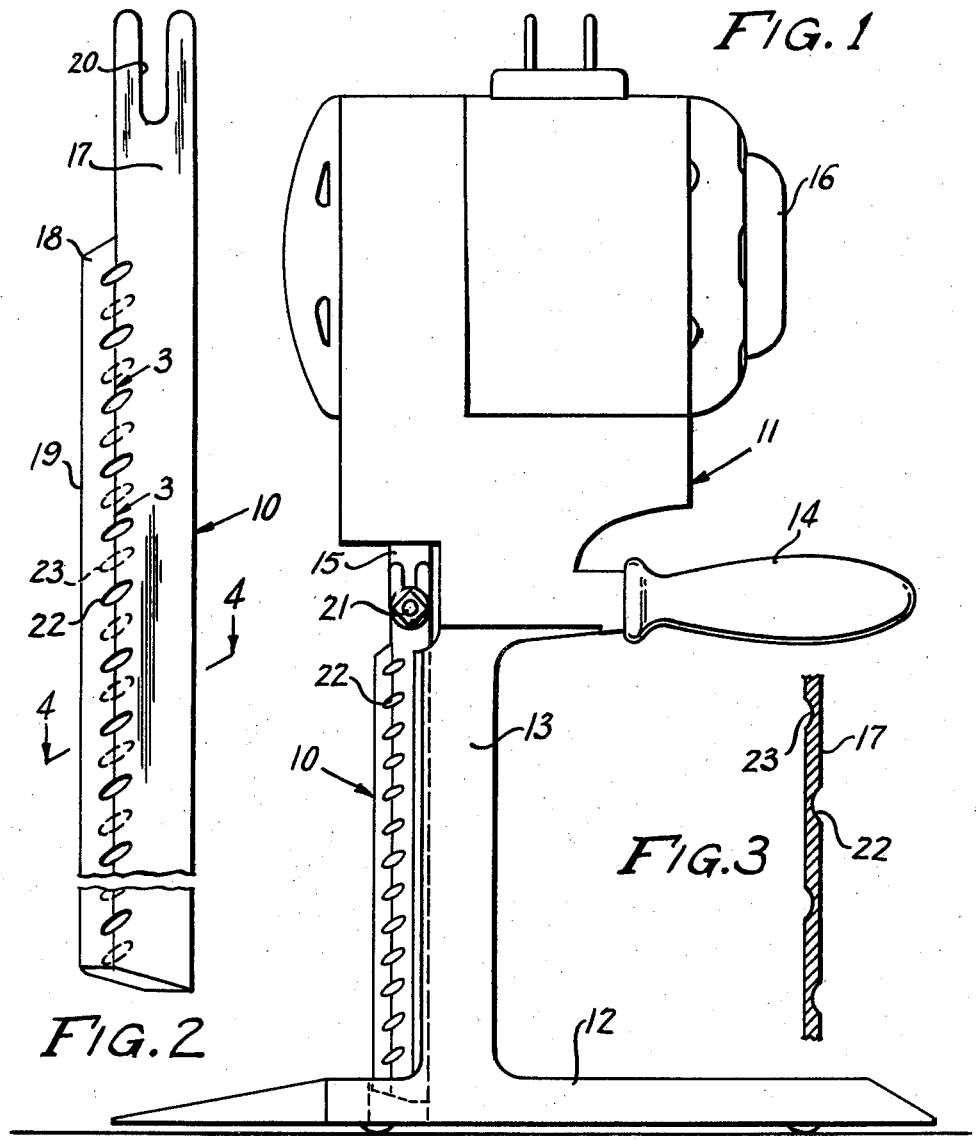
INVENTOR.
HERMAN C. BEAVER
BY
Patrick D. Beaver
ATTY.

United States Patent Office 2,937,442
Patented May 24, 1960

2,937,442

STANDARD CLOTH CUTTING MACHINE BLADE

Herman C. Beaver, 844 N. 6th St., Sunbury, Pa.

Filed Jan. 12, 1959, Ser. No. 786,122

1 Claim. (Cl. 30—351)

This invention relates to improvement in cutting devices and more particularly to an improved blade for use in standard cloth cutting machines.

The principal object of the present invention is to provide a blade, which is so constructed as to minimize heating and fusing of the material during the operation of cutting the same. This has been an objection attributed to present day blades used in cutting such materials as nylon, plastics and various other sheet materials.

Another object of the present invention is to provide a cutting blade of the character stated, which will permit aeration of the blade to cause rapid conductivity or dissipation of heat from the cutting edge of the blade, thus permitting material to be piled higher and a greater volume cut than through the medium of the present types of cutting blades, which at present, deteriorate from crystallization (excess heat tolerance) and the fact that the materials being cut frequently are scorched or ruined.

These and various other objects and advantages of the invention will become apparent to the reader of the following description.

In the drawing:

Figure 1 is a side elevational view of a conventional cutting machine showing the improved blade installed.

Figure 2 is an enlarged side elevational view of the blade, broken, but showing the improved feature thereof.

Figure 3 is an enlarged fragmentary longitudinal sectional view on line 3—3 of Figure 2.

Figure 4 is an angular section transversely through the blade taken on line 4—4 of Figure 2.

Referring to the drawing wherein like numerals designate like parts, it can be seen that numeral 10 generally refers to the improved blade, which is associated with a conventional operating machine generally referred to by numeral 11 and which conventionally consists of a base 12, an upright 13 formed with a grooveway for said blade 10, a handle 14 and a drive element 15 extending downwardly from the motor 16. Of course, these machines may vary according to the disposition of the various manufacturers and the desires of the users.

It will be observed, that the blade 10 consists of an elongated bar 17 of high-grade tempered steel, having a laterally disposed cutting portion 18, which is ground or otherwise formed to provide a cutting edge 19.

The upper portion of the bar 17 projects upwardly beyond the cutting edge portion 18 and is slotted as at 20 to receive the connecting element 21 of the motor drive 15, as is shown in Figure 1.

The principal feature of improvement in this blade over blades such as are disclosed in the prior art, is the formation of the bar 17 and cutting portion 18 with grooves or chamfers, there being a row of said chamfers in spaced relation along one side of the bar 17 and overlapping the portion 18 thereof, these chamfers denoted by numeral 22, while on the other side there is another row, with the chamfers thereof being denoted by numeral 23.

As will be apparent from an observation of Figures 2 and 3, the chamfers 22 at one side of the bar 17 and its blade portion 18 are off-set with respect to the chamfers 23 on the other side. This minimizes weakening of the blade, yet affords a uniform dissipation of heat due to friction of the blade with the material being cut. This allows for a more uniform acceptance of air into the chamfers in order to carry the heat away. These chamfers serve to promote more rapid conductivity of heat away from the cutting edge 19 and into the heavier part of the blade and from there radiated.

Obviously, the motor 16 of the conventional machine serves, through its drive 15 to vertically reciprocate the blade 10, and the blade formed as in the manner above described, has a longer durability than conventional blades due to the fact that its specific construction takes care of the disipation of a substantial amount of heat developed by friction in the contact of the blade with materials during the cutting operation.

This saves time in disconnecting the blade from the drive 15 and replacing the same. The entire outfit can be used over a much longer period of time. The overall extent of saving both in materials ruined, blade replacement and labor is considerable.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

In a sheet material cutting machine, a blade for vertical reciprocatory cutting action through piled sheets of material comprising a substantially thick back portion and a tapered blade portion having a straight cutting edge, said blade thus formed defining a shoulder where the taper of the blade portion merges with the back, said blade being formed with depressions extending rearwardly in the tapered blade portion and through said shoulder into said back portion, to dissipate heat, said depressions being elongated and being inclined from the tapered blade portion into the back portion and terminating short of said cutting edge, said elongated depressions being arranged in one row on each side of the blade and with the depressions of one row staggered with respect to the depressions on the opposite side of the blade the spacing of said depressions being in excess of the width thereof.

References Cited in the file of this patent

UNITED STATES PATENTS

| | | |
|---|---|---|
| 2,049,823 | Reichert | Aug. 4, 1936 |
| 2,171,604 | Segal | Sept. 5, 1939 |
| 2,671,267 | Michalek | Mar. 9, 1954 |

FOREIGN PATENTS

| | | |
|---|---|---|
| 105,966 | Sweden | Nov. 17, 1942 |